United States Patent [19]

Albanese et al.

[11] 4,024,541

[45] May 17, 1977

[54] RADAR ADAPTIVE SIGNAL PROCESSOR SYSTEM

[75] Inventors: Angelo P. Albanese, Brooklyn; Chester A. Palmieri, New Hyde Park; David H. Rattiner, Great Neck, all of N.Y.

[73] Assignee: Sperry Rand Corporation, New York, N.Y.

[22] Filed: Sept. 8, 1970

[21] Appl. No.: 70,277

[52] U.S. Cl. .................. 343/17.1 R; 343/5 R; 343/7.7
[51] Int. Cl.² .................. G01S 7/28; G01S 9/02; G01S 9/42
[58] Field of Search ............... 343/5 R, 7.7, 17.1 R

[56] References Cited

UNITED STATES PATENTS

| | | | |
|---|---|---|---|
| 2,736,021 | 2/1956 | Sunstein | 343/17.1 R |
| 3,223,999 | 12/1965 | Groginsky | 343/17.1 R |
| 3,423,682 | 1/1969 | Cauchois | 343/17.1 R X |
| 3,465,336 | 9/1969 | Fishbein et al. | 343/7.7 |
| 3,576,564 | 4/1971 | Galvin | 343/17.1 R |

Primary Examiner—Malcolm F. Hubler
Attorney, Agent, or Firm—Howard P. Terry

[57] ABSTRACT

An adaptive signal processing system for enhancing the signal-to-interference characteristics of a pulse radar system exposed to clutter signals as well as to desired target signals is disclosed. The time-extended clutter signals, along with specially generated phase reference signals are employed in a multi-element adaptive filter-correlator system to reduce the clutter presence in the radar receiver output to a minimum value for all target ranges and for both volume and surface clutter.

9 Claims, 3 Drawing Figures

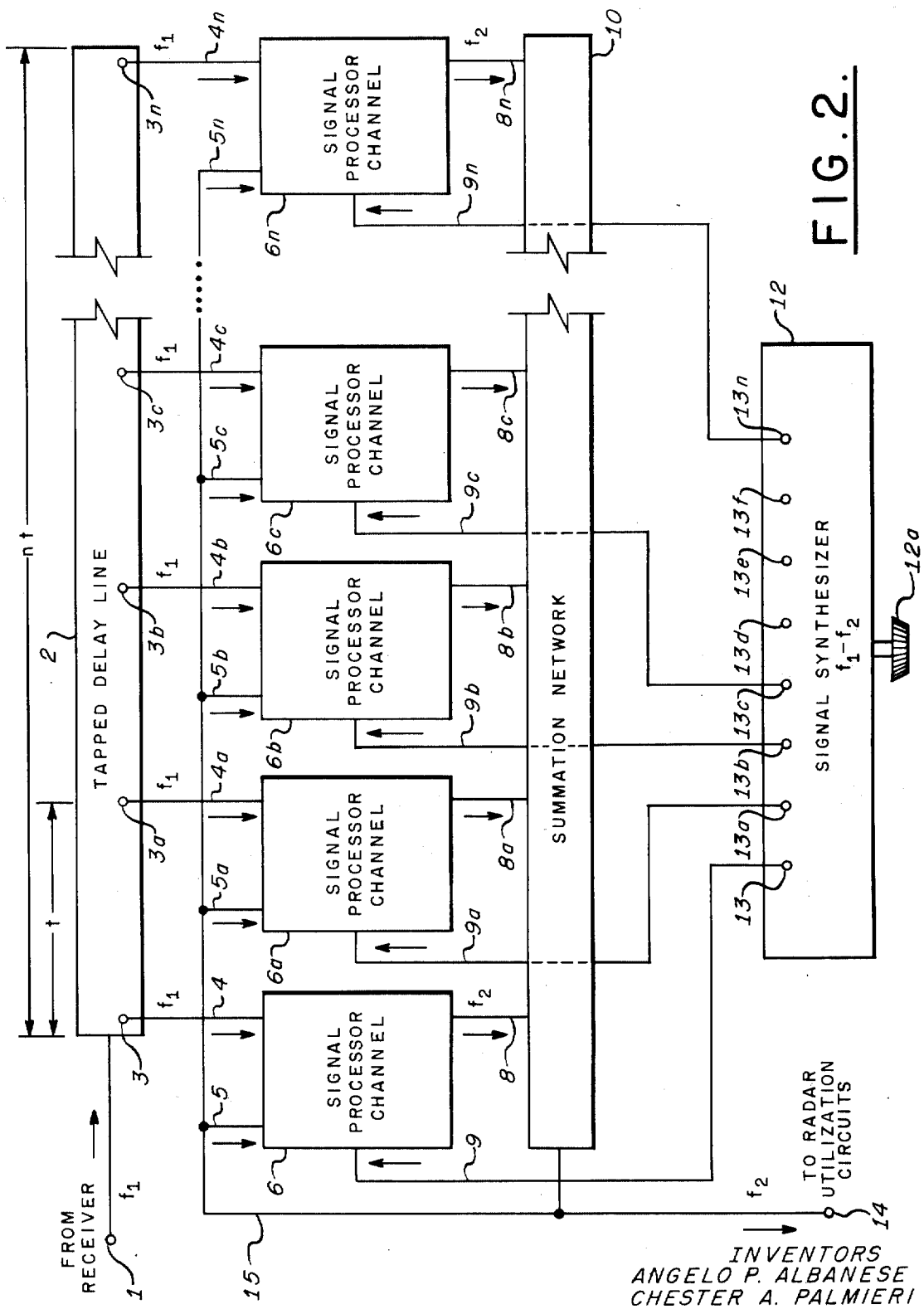

4,024,541

RADAR ADAPTIVE SIGNAL PROCESSOR SYSTEM

CROSS REFERENCE TO RELATED APPLICATION

This document discloses apparatus used in carrying out the invention of the co-pending patent application Ser. No. 70,194 for an "Adaptive Signal Processor for Clutter Elimination," filed Sept. 8, 1970 and also assigned to the Sperry Rand Corporation.

BACKGROUND OF THE INVENTION

1. Field of the Invention

The invention pertains to pulse radar receiver systems and more particularly to means for significant improvement of signal detection in pulse radar receivers exposed to clutter interference signals which may be of relatively high magnitude compared to desired target echoes, clutter signals such as rain, sea, or ground clutter return signals.

2. Description of the Prior Art

In prior art radar systems, various arrangements have been proposed for improving signal detectability, especially in the presence of interfering clutter signals such as ground return or rain return clutter. Moving target discriminating systems have, for instance, afforded a degree of signal-to-interference ratio improvement in efficiently diminishing the effects of clutter signals caused by stationary reflectors, such as the earth's surface. Non-adaptive radar signal processors provide acceptble clutter rejection for particular ranges and for particular types of clutter, but the performance of such systems degrades under varying clutter conditions. Further, when no interfering clutter is present, conventional non-adaptive processors are not generally optimum in the presence of ordinary electrical noise alone.

Matched filter signal processors have also been of interest for diminishing the effects of interfering clutter. However, such devices have not proven to achieve useful results under dynamically changing clutter conditions and in all range sectors. Defective results are noted particularly in matched filter operation upon the echo returns from multiple-pulse burst transmission radar systems. Matched filter processors fail to give required signal interference cancellation, for example, when the target of interest lies in particular periods of the several interpulse periods of the multi-pulse burst. Only in other particular interpulse periods may an acceptable signal-to-interference ratio be achieved. Thus, the total effect in such matched filter systems of the ultimate addition of the individual returns from a multiple-pulse burst is to yield an output having a degraded signal-to-interference ratio.

SUMMARY OF THE INVENTION

The invention is a dynamic signal processor system for effecting enhanced radar discrimination of target echoes in the presence of interfering clutter signals. The invention incorporates a time-varying filter system which adapts automatically to adjust its characteristics to optimum for each varying clutter return condition. Whether the transmitted radar impulses encounter rain or other weather clutter sources or ground clutter sources, or meet no such reflecting source, the adaptive filter system processes the received signal in an optimum manner for achieving maximum signal-to-interference performance of the radar system.

The adaptive time-variant filter system of the invention automatically alters its effective transfer function characteristic to minimize the output clutter of the radar receiver and to yield an output having a maximum signal-to-interference ratio. Appropriate variation of the filter characteristic is governed by the clutter signal input to the radar itself because of its conveniently time-extended nature. Certain control loops and correlator devices within the processor are primarily sensitive to these extended clutter signals, rather than responding to the short duration echo impulses returned from actual targets. Adaptive control is achieved by simultaneous plural measurements of the degree of correlation between the residual clutter voltage generated by the adaptive system and clutter voltage signals going into it. Any clutter remaining at the filter output generates a control voltage at the correlator outputs for modifying the filter transfer function characteristic so as to cause the residual clutter output signal to approach zero. The correlation control voltages and additional Doppler reference voltages having progressively incrementally varying phases permit processing of targets of selected target radial rates. Weighting voltages are adjusted by the presence of clutter and perform in the correlation process to maximize the final output signal-to-interference ratio.

BRIEF DESCRIPTION OF THE DRAWINGS

FIG. 2 is a block diagram showing how elements of the invention cooperate.

DESCRIPTION OF THE PREFERRED EMBODIMENT

The invention is an adaptive signal processor apparatus for application in a radar system and which automatically adapts itself so as beneficially to process received radar signals having components representing target echoes and often other relatively large components due to the presence of clutter which adversely affect the operation of conventional radar systems. Such clutter may, for example, be generated by ground return or by rainfall in which the target is immersed. The novel adaptive processor mechanism provides rejection of the adverse effects of such types of clutter and permits the echo components truly representing a desired target to be extracted therefrom and to be used successfully for dependable radar display, control, or other purposes.

A significant feature of the novel adaptive signal processor system lies in its ability to operate as an adaptive time-varying filter that adapts automatically to present the optimum processing characteristics for time varying and other clutter conditions. For example, when the radar echoes contain patterns of interference due to ground clutter and even to rapidly varying rainfall clutter conditions, the novel processor continues to operate upon the received signal components in an optimum way finally to yield processed target echo signals having a maximum signal-to-interference ratio.

Figure 1:
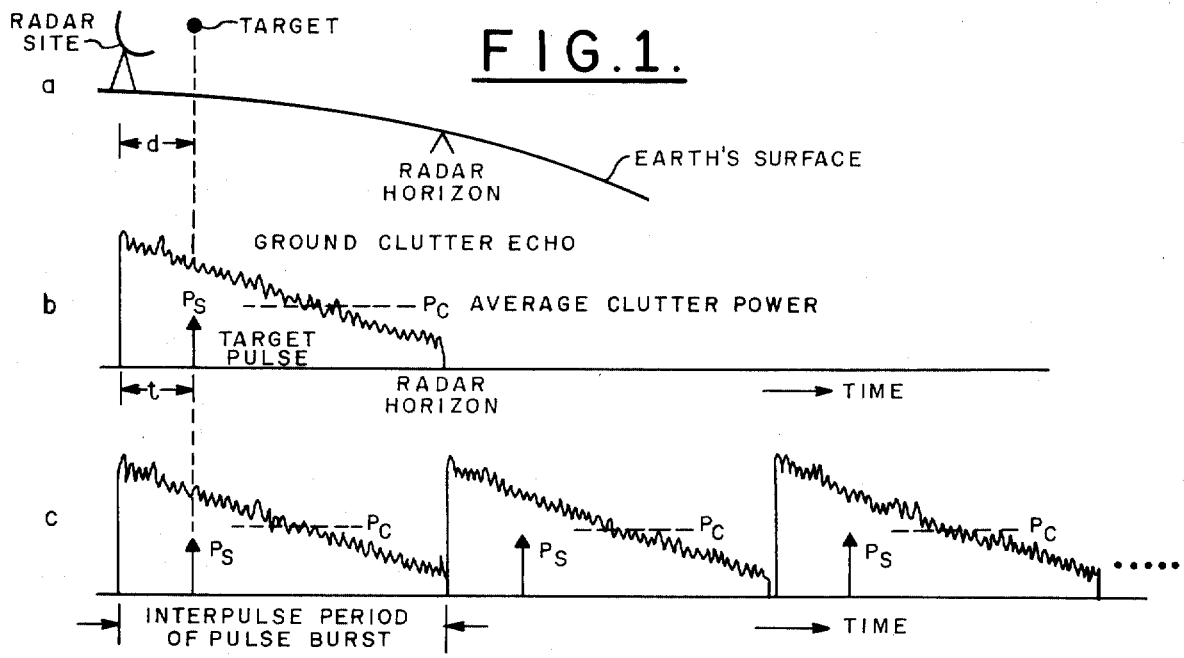
FIG. 1 includes graphs useful in explaining the operation of a radar system utilizing the invention.

Referring to level $a$ in FIG. 1, the general geometry of the radar problem is illustrated so as to indicate the site of the radar system, the location of a target, and the horizon where ground clutter returns may substantially end because of the curvature of the earth's surface. At level $b$ in FIG. 1, the radar return signal for the instance of the most conventional type of pulse radar system is shown. A single return target echo pulse $P_s$ is seen at time $t$ relative to the time of transmission of a single pulse from the radar transmitter and coresponding to the range $d$ of the target. A typical ground clutter echo is illustrated having an average clutter power $P_c$ on the order of the amplitude of the desired target echo pulse signal $P_s$. To this ground clutter, interference signals may also be added to further significance due, for example, to the presence of rain. Thus, the echo signal, when the radar transmits one pulse per repetition cycle, is composed of a narrow pulse $P_s$ corresponding in time to the target range and a time or range-extended clutter echo composed of a random distribution of pulses. A wide variety of clutter patterns is possible, including substantially no clutter.

In a preferred form of the present invention, a radar system employing transmitter pulse bursts each comprising a multiplicity of transmitted pulses is used. Such pulse burst radar systems have been demonstrated, when used with prior art types of signal processors, to yield signal-to-interference characteristics improved in some degree. The adaptive processor of the present invention will be presented in the environment of such a pulse burst radar system.

Referring to level $c$ of FIG. 1, it is assumed, for example, than n transmitted pulses, generally equally spaced apart in time and of substantially equal amplitude are transmitted in each pulse burst packet, one such packet being emitted for each radar repetition cycle. A representative value of $n$ is 8, though $n$ may have other values, including odd values. The graph of level $c$ of FIG. 1 shows only the first three parts of the consequent echo, the other $n$-3 parts being generally similar to the first three on a macroscopic basis. It is observed that the target echo $P_s$ appears n times, still in the same time relation to each transmitted pulse comprising the pulse packet, and that the clutter interference train is similar repeated. More complex models of the echo pattern include the case in which a relatively shorter interpulse period may produce clutter patterns actually overlapping two or more interpulse periods.

The general structure and operation of the novel radar adaptive signal processor will be understood with reference to FIG. 2. The chain of target echoes with accompanying clutter trains as seen in level $c$ of FIG. 1 is prepared in conventional high frequency and intermediate frequency radar receiver circuits for application as a signal of nominal center frequency $f_1$ to terminal 1 of a delay line 2 having $n$ output taps 3, 3a, 3b, ..., 3n generally placed at equal intervals along the delay line or otherwise arranged to delay input signals by substantially equal amounts. A delay line identical to that used in the radar system transmitter for producing the transmitted burst of $n$ pulses may be employed. Alternatively, techniques employed in digital processing systems and in radar moving target indicator apparatus may also be employed. In such an arrangement, the delay line 2 is also used on a sharing basis to determine the interpulse period of the transmitted pulses. While the specific means involved in the above function is not necessarily a part of the present invention, a single low loss, fused quartz, ultrasonic delay line or a plurality of such delay lines may be employed to perform the function of delay line 2. In general, the signal input to delay line 2 may have a carrier frequency in the megacycle per second range and may require a ten percent band width. Line 2 may be placed in a thermally stable oven.

The delay line taps 3, 3a, 3b, ..., 3n are respectively coupled to form a set of first inputs on leads 4, 4a, 4b, ..., 4n to substantially identical signal processor channels 6, 6a, 6b ..., 6n, whose essential features will be further described with reference to FIG. 3. Each of the first set of inputs is of frequency $f_1$ and may contain target echoes and interference components of considerable amplitude. Each of signal processor channels 6, 6a, 6b, ..., 6n, has two additional inputs, as will be seen.

A first set of outputs of the respective processor channels appering respectively on leads 8, 8a, 8b, ..., 8n of processors 6, 6a, 6b, ..., 6n is coupled by those leads to the input of voltage summation network 10. Summation circuit 10 is typically a conventional resistance network of the kind ordinarily used coherently to add the voltages of n input signals of common phase and frequency and to supply a true sum signal on a single output, such as on feed back lead 15. As will be seen, the sum voltage signal on lead 15 represents the residual level of the clutter signals and is coupled to the second set of inputs 5, 5a, 5b, ..., 5n of the respective signal processor channels 6, 6a, 6b, ..., 6n.

A third set of inputs is applied to the respective signal processor channels 6, 6a, 6b, ... 6n via leads 9, 9a, 9b, ..., 9n and originates on the respective terminals 13, 13a, 13b, ..., 13n of signal synthesizer 12. This third set of input signals constitutes fixed amplitude or reference signals of frequency $f_1 f_2$ and of progressively different phases as one goes from terminal 13 to terminal 13n. These reference signals, as applied to the respective processor channels 6, 6a, 6b, 6c, ..., 6n, have a characteristic phase progression corresponding to the phase progression which would appear at successively equal times in a selected Doppler frequency corresponding to an anticipated radial velocity of a selected target. Signal synthesizer 12 may be adjusted manually by use of manually controlled knob 12a to produce any of a different series of such equally spaced phase progressions on terminals 13, 13a, 13b, ..., 13n, the progressions having different phase spacings corresponding to a succession of different possible target radial velocities. By such selection, the adaptive system is, in effect, tuned to process data for a target of particular radial velocity. It will be understood that automatic positioning of adjustment 12a is within the scope of the present invention; evidently, known radar means for measurement of the Doppler velocity displacement may be used to supply a control voltage to a suitable servo for operation of adjustment 12a. Furthermore, it will be understood that selection of the appropriate reference voltage phase sequence compensates for actual Doppler phase shift of a target of interest so that coherent addition can actually be practiced in summation network 10.

From the foregoing, it will be appreciated that the output at each tap 3, 3a, 3b, ..., 3n of delay line 2 has an associated control loop respectively comprising a signal processing channel 6, 6a, 6b, ..., 6n which modifies its respective delay line tap output for summation with all other tap outputs by voltage summation network 10. The summation output is supplied by feed back connection 15 to each of the individual control loops via respective signal processing channels 6, 6a, 6b, ..., 6n.

It is understood that target echo signals and clutter retrun from each pulse component of the pulse burst packet are present at the respective taps 3, 3a, 3b, ...

, 3n of delay line 2. Each individual control loop adapts its characteristics to find the correlation between the individual outputs of taps 3, 3a, 3b, . . . ,3n and the voltage summation output of network 10.

In each processor 6, 6a, 6b, . . . , 6n, the correlation voltage derived from an internal correlator is substracted from the anticipated Doppler reference voltage from signal synthesizer 12. The amplitude-difference signal is amplified and is used to form a product by amplitude multiplication with the coresponding tap clutter voltage. The effect of the control loop associated with each of the n signal processor loops is to adjust the amplitude and pahse of the clutter voltage at each respective tap 3, 3a, 3b, . . . , 3n such that the summation output of network 10 is substantially zero.

Whereas the signal processor channels 6, 6a, 6b, . . . , 6n and their associated loops cause the clutter voltages to be substantially cancelled in voltage summation network 10, the desired target echo components are coherently summed because of the action of tapped delay line 2 and because corelator devices found in signal processor channels 6, 6a, 6b, . . . , 6n do not respond to the very short target echo pulses. However, the same correlator devices respond optimally to the extended time function derived from the undesired clutter echoes. The desired target output signals may be derived from feed back line 15 at terminal 14 for application to the radar system displays or controls.

As noted previously, signal synthesizer 12 produces a set of reference signals of frequency $f_1-f_2$ having progressively incrementally different phases, which set is available on terminals 13, 13a, 13b, . . . , 13n for application to the respective signal processor channels 6, 6a, 6b, . . . , 6n. These reference signals each have the same amplitudes and the same intermediate frequencies, but they have a characteristic phase progression corresponding to the phase progression which would appear at successive equal times in a selected Doppler frequency signal corresponding to an anticipated radial velocity of a target. By selection of particular sets of differently spaced phase progressions at the output of signal synthesizer 12, the adaptive system is tuned efficiently to process data for a target of particular radial velocity.

Generation by a conventional receiver master local oscillator of a reference signal of relatively stable amplitude, frequency, and phase for excitation of frequency synthesizer 12 may be accomplished by well known radar receiver techniques. Further, such a signal may be operated upon according to any of several known methods to produce simultaneously on independent output leads a set of signals having incrementally varying or shifted phase characteristics.

A representative available method for readily producing the desired incrementally phase shifted signals employs simply a series connection of ordinary equal phase shifter circuit with taps between each such circuit for extracting the incrementally phase shifted signals and supplying them to terminals 13, 13a, 13b, . . . , 13n. A particular set of phase progressions is supplied by a first such series phase shifter circuit. It is readily apparent that a second particular set of phase progressions is supplied by switching to a second such series of phase shifter circuits having a second phase shift increment. A plurality of such selectable series circuits readily provides the desired selectable sets of phase shifted reference signals. Amplification may, of course, be supplied to compensation of any insertion loss due to the individual phase shifter circuits.

Figure 3:
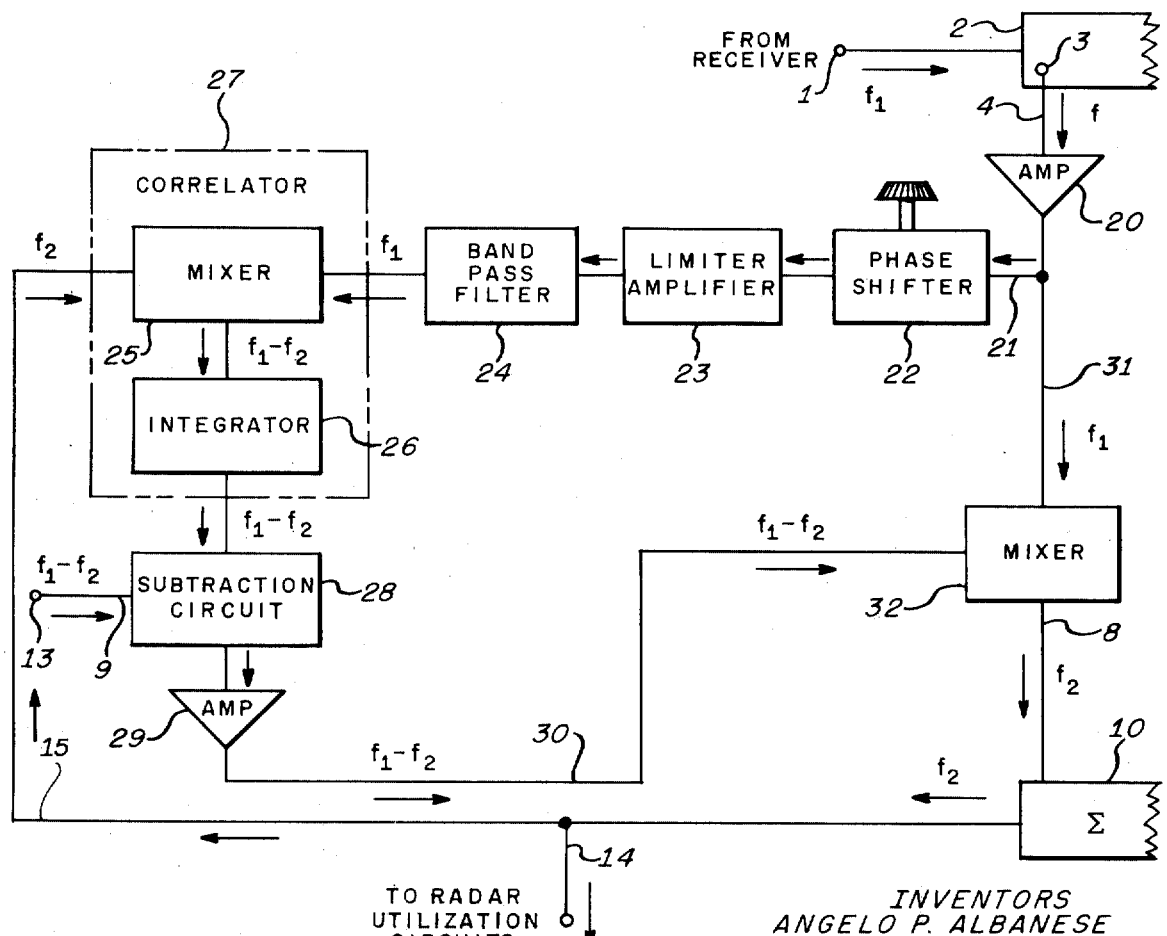
FIG. 3 is a block diagram in greater detail of a typical portion of the apparatus of FIG. 2.

FIG. 3 shows in a detailed manner the structure of signal processor channel 6 of FIG. 2; since signal processor channels 6, 6a, 6b, . . . , 6n are similar circuits, only channel 6 and its associated connections need be discussed in detail. In FIG. 3, parts already discussed in connection with FIG. 2 are indicated by the same reference numerals, including tapped delay line input 1, the delay line 2 itself, tap 3, tap lead 4, the residual clutter output lead 15, signal processor channel 6, lead 8, reference oscillation lead 9, voltage summation network 10, terminals 13 of signal synchronizer 12, and the processor system output terminal 14.

As mentioned above, terminal 1 of FIG. 3 is attached, for instance, to the output of a pulse burst radar system receiver adapted to receive substantially regularly spaced echo signals from a target in space illuminated by a pulse burst radar transmitter, for example, of the type emitting n successive generally equally and closely grouped transmitter pulses for each repetition cycle. The echo pulses applied to terminal 1 have a carrier frequency $f_1$ in the megacycle per second range, for example, in the range between 10 and 100 megacycles per second, and are applied to the input transducer of delay line 2. As is well known in the radar art, various noise and interference signals are simultaneously received at terminal 1 along with the desired target echo signals.

In the case of signal processor channel 6, the first tap 3 on delay line 2 has its output supplied by lead 4 to amplifier 20. Amplifier 20 has a moderate gain level, such as to overcome the losses in delay line 2 and to contribute sufficient signal for the proper operation of the signal processor loop including channel 6 and feed back connector 15. Amplifier 20 has a pass band centered on frequency $f_1$ of width, for example, about ten percent of frequency $f_1$. The output of amplifier 20 passes through one portion 21 of a branching conductor to a trimmer phase shifter 22. As will be seen, trimmer 22 provides means for adjustment of the phase shift within the loop so as to suppress any undesired tendency of the loop to oscillate. More important, proper adjustment of the set of such phase shifters used in processors 6, 6a, 6b, . . . , 6n aids adjustment for minimum output clutter residue.

The output, still of frequency $f_1$, derived from phase shifter 22 is applied to limiter-amplifier or hard limiter circuit 23, a device playing a significant role in the invention in that it processes input signals in such a way that succeeding elements in the circuit, the mixer 25 of correlator 27, can properly function. Before being acceptable for use in mixer 25, however, the output of limiter 23 is subjected to the action of band pass filter 24. Because of its known inherent nature, hard limiter amplifier 23 tends to spread the spectrum of signal $f_1$ beyond its original band, particularly by the generation of undesired harmonic components. Band pass filter 24 beneficially brings the spectrum applied to mixer 25 back generally to the band width it originally occupied when put into limiter-amplifier 23.

Mixer 25 receives signal $f_1$ as above noted and, on feed back lead 15, receives a signal of frequency $f_2$ from the output of summation circuit 10. Mixer 25 may be a commonly used double balanced mixer of the known diode bridge type adapted to multiply the input amplitudes of signals $f_1$ and $f_2$ and to pass a signal whose frequency is the difference $f_1-f_2$ of those frequencies to integrator circuit 26.

Integrator 26 is a second part of what may be termed a correlator circuit which includes mixer 25. Integrator 26 may take the form of a relatively narrow pass band, high Q, single pole filter circuit for taking the integral as a function of time of the amplitude of its input signal. As will be seen, integrator 26 smooths or time-averages and filter its incoming signal and furnishes an output whose amplitude represents primarily the extent in time of clutter interference signals found in the returns received by the radar antenna. In this operation, the effect of the presence of any target return may be ignored, since such returns will be seen to contribute substantially nothing to the output of integrator 26 and correlator 27. Correlator 27 compares the similarity between the amplitudes of its input signals $f_1$ and $f_2$. When they are totally un-alike, i.e., when the amplitude of signal $f_2$ on feed back lead 15 approaches zero, the correlator output is substantially zero.

The output of correlator 27 is passed as an input of frequency $f_1-f_2$ to amplitude substrator 28 along with a reference signal of frequency $f_1-f_2$ derived on lead 9 from terminal 13 of the signal synthesizer 12 shown in FIG. 2. It will be recalled that the terminal 13 signal has a particular reference phase $\phi$ (terminals 13 to 13n have progressively different reference phases $\phi$ to $\phi_n$). Substraction circuit 28 is a subtraction device known in the art for yielding an output signal still of frequency $f_1-f_2$, but of diminished amplitude. A conventional passive intermediate frequency hybrid junction circuit, for example, may be used as circuit 28.

The output of subtractor 28 is applied to mixer 32 via amplifier 29, which amplifier may be a conventional device having relatively high gain and moderate to wide band width characteristics for the purpose of minimizing loop errors. Mixer 32 is, for example, a mixer similar to mixer 25 and may be of the conventional double balanced mixer kind. It is adapted to multiply the individual amplitudes of signals input to it on leads 30 and 31, but is connected so as to pass the sum of the input frequencies $f_1-f_2$ and $f_1$, which is frequency $f_2$. It is seen that lead 30 supplies a weighting signal of frequency $f_1-f_2$ from the output of amplifier 29 and that the branching conductor 31 from amplifier 20 supplies a signal of frequency $f_1$ to mixer 32 including target and clutter signals. The output of mixer 32 is a signal at frequency $f_2$ and is applied to the first of n inputs of the voltage summation network 10.

It is seen from the above that signal processor channel 6 (and the similar channels 6a to 6n) is in the nature of a self-corrective adaptive correlator channel which, along with channels 6a to 6n, contributes coherent signals to voltage summation network 10 within which a residual clutter output signal is generated for application to the individual correlators 27 to 27n of the respective channels 6 to 6n.

In operation, limited amplifier 23 is designed to have a sufficiently wide band with sufficient gain to establish a minimum level of the input interference or clutter signals at an arbitrary value. Clutter or interference signals below that predetermined minimum value are raised to it. Since all clutter signals above that predetermined minimum lever are clipped by the limiting action of limiter device 23, relatively wide band width is necessary to provide short time constants for preventing the limiter from adversely distorting the clipped signals. Spurious signals generated in the limiting process are substantially eliminated by the band pass filter 24. Thus, the limiter-amplifier 23 maintains the proper operating lever of the signal $f_1$ input to mixer 25 and enables the system comfortably to handle input signals of wide dynamic range. Since limiting will occur on substantially minimum level clutter returns, mixer 25 will always be in operation in the presence of clutter signals, assuring continual clutter cancellation of all of the input clutter and guaranteeing linear loop operation for low output clutter residues. Without the use of the limiter, only a small range of amplitudes of clutter power can be effectively cancelled because the efficiency of mixer 25 decreases as a function of decreasing clutter level. Thus, the weighting voltage supplied by amplifier 29 would not maintain the proper voltage lelvel for optimum clutter cancellation.

The transient response of the loop including processor channel 6 and feed back lead 15 depends upon the time constant of integrator 26, the total loop gain, and the input clutter or interference power level. Preferably, the time constant of integrator 26 is selected to obtain a desired average of extended input clutter signals and minimum response to signal returns from actual targets.

Amplifier 29 is a relatively high gain device for the purpose of reducing loop errors. So as to maintain stable loop operation, amplifier 29 is selected to have a low noise figure and a band width greater than integrator 26. Such a band width assures that the loop stability is governed mainly by integrator 26.

While the invention has been described in its preferred embodiment, it is to be understood that the words which have been used are words of description rather than of limitation and that changes within the purview of the appended claims may be made without departure from the true scope and spirit of the invention in its broader aspects.

We claim:

1. Apparatus for improving the signal-to-interference characteristic of a composite signal comprising a pulse signal in the presence of an extended interference signal, said apparatus comprising:
    first multiplier-mixer means having first and second input means and output means,
    first circuit means for supplying said composite signal to said first input means of said first mixer-multiplier means,
    second circuit means for receiving said composite signal and for supplying an output to said second input means of said first multiplier-mixer means,
    said second circuit means comprising in series relation:
        limiter-amplifier means,
        band pass filter means,
        correlator means having first and second input means and output means, and
        circuit means for applying an output of said correltor output means to said second input means of said first multiplier-mixer means,
    circuit feed back means for applying an output of said first mixer-multiplier means to said second input means of said correlator means, and
    output means coupled to said circuit feed back means.

2. Apparatus as described in claim 1, wherein the pass band of said band pass filter means is substantially equal to the input pass band of said limiter-amplifier means.

3. Apparatus as described in claim 1, wherein said correlator comprises:
- second mixer-multiplier means having first and second input means and output means,
- integrator means having input means and output means and a characteristic settling time,
- said second mixer-multiplier output means being coupled to said integrator input means.

4. Apparatus as described in claim 3, wherein:
- said first mixer-multiplier first and second input means are supplied with input signals of respective carrier frequencies $f_1$ and $f_1-f_2$ and said first mixer-multiplier means supplies an output signal of frequency $f_2$ and,
- said second mixer-multiplier first and second input means are supplied with input signals of respective carrier frequencies $f_1$ and $f_2$ and said second mixer-multiplier means supplies an outer signal of frequency $f_1-f_2$.

5. Apparatus as described in claim 1, wherein said second circuit means includes, in series relation between said correlator means and said second input means of said first multiplier-mixer means, amplitude subtraction circuit means,
- said subtraction means having first and second input means and output means,
- said first input means being coupled to said correlator means,
- said output means being coupled to said first mixer-multiplier means, and
- said second input means being adapted to supply to said subtractor means a stable-amplitude phase reference signal.

6. Apparatus for improving the signal-to-interference characteristics of a composite signal comprising a pulse signal in the presence of an extended interference signal, said apparatus comprising:
- means for forming a substantially constant amplitude signal for the duration of said interference signal including:
  - limiter-amplifier means responsive to said composite signal, and
  - band pass filter means, said band pass filter means being responsive to said limiter amplifier means and having substantially the same pass band as the input to said limiter-amplifier means,
- first means for multiplying said substantially constant amplitude signal by a residual factor signal to produce a first product signal,
- means for time-integrating said first product signal,
- second means for multiplying said time-integrated product signal by said composite signal to produce a product residual factor signal containing said desired signal stripped of s substantial portion of said extended interference signal,
- means for feeding back said residual factor signal to said first multiplier means, and
- means to supply said residual factor signal to other utilization apparatus.

7. Apparatus as described in claim 6 wherein said first means for multiplying comprises mixer-multiplier means adapted to multiply the amplitudes of input carrier signals of frequency $f_1$ and $f_2$ and to yield a signal of frequency $f_1-f_2$.

8. Apparatus as described in claim 6 wherein said second means for multiplying comprises mixer multiplier means adapted to multiply the amplitudes of input carrier signals of frequency $f_1-f_2$ and $f_1$ and to yield a signal of frequency $f_2$.

9. Apparatus as described in claim 6 directly following said time-integrating means including means for subtracting a constant-amplitude phase reference signal from said time integrated product signal.

* * * * *